US008587217B2

(12) United States Patent
Melanson

(10) Patent No.: US 8,587,217 B2
(45) Date of Patent: Nov. 19, 2013

(54) MULTI-LED CONTROL

(75) Inventor: John L. Melanson, Austin, TX (US)

(73) Assignee: Cirrus Logic, Inc., Austin, TX (US)

( * ) Notice: Subject to any disclaimer, the term of this patent is extended or adjusted under 35 U.S.C. 154(b) by 182 days.

(21) Appl. No.: 12/675,035

(22) PCT Filed: Aug. 23, 2008

(86) PCT No.: PCT/US2008/074133
§ 371 (c)(1),
(2), (4) Date: Feb. 24, 2010

(87) PCT Pub. No.: WO2009/029553
PCT Pub. Date: Mar. 5, 2009

(65) Prior Publication Data
US 2011/0210674 A1    Sep. 1, 2011

Related U.S. Application Data

(60) Provisional application No. 60/957,753, filed on Aug. 24, 2007.

(51) Int. Cl.
| G05F 1/00 | (2006.01) |
| H05B 37/02 | (2006.01) |
| H05B 39/04 | (2006.01) |
| H05B 41/36 | (2006.01) |
| H05B 37/00 | (2006.01) |
| H05B 39/00 | (2006.01) |
| H05B 41/00 | (2006.01) |

(52) U.S. Cl.
USPC .............................. 315/294; 315/186; 315/312

(58) Field of Classification Search
None
See application file for complete search history.

(56) References Cited

U.S. PATENT DOCUMENTS 6,016,038 A   1/2000  Mueller et al.
6,150,774 A   11/2000 Mueller et al.
(Continued)

FOREIGN PATENT DOCUMENTS

EP  1528785   4/2005
EP  1589519 A2  10/2005
(Continued)

OTHER PUBLICATIONS

International Search Report and Written Opinion of the International Searching Authority for PCT/US2008/074133, dated Apr. 27, 2009.

(Continued)

*Primary Examiner* — Douglas W Owens
*Assistant Examiner* — Dedei K Hammond
(74) *Attorney, Agent, or Firm* — Terrile, Cannatti, Chambers & Holland, LLP; Kent B. Chambers

(57) ABSTRACT

A LED driver and controller system utilizes switches to parallel connect to respective sets of one or more LEDs and a current source to provide efficient control of the LEDs. In at least one embodiment, the LEDs are connected in series. An LED controller of the LED driver and controller system 200 controls conductivity of the switches. In at least one embodiment, the LED controller provides control signals to one or more LED drivers. The LED drivers receive the control signals and, in response to the control signals, control the conductivity of each switch. In at least one embodiment, the conductivity of the each switch is controlled using a duty cycle modulated control signal. In at least one embodiment, the duty cycle modulated control signal is a pulse width modulated control signal. In another embodiment, the duty cycle modulated control signal is a pulse density modulated control signal.

27 Claims, 6 Drawing Sheets

(56) References Cited

U.S. PATENT DOCUMENTS

| | | |
|---|---|---|
| 6,166,496 A | 12/2000 | Lys et al. |
| 6,211,626 B1 | 4/2001 | Lys et al. |
| 6,340,868 B1 | 1/2002 | Lys et al. |
| 6,369,525 B1 | 4/2002 | Chang et al. |
| 6,441,558 B1 | 8/2002 | Muthu et al. |
| 6,459,919 B1 | 10/2002 | Lys et al. |
| 6,495,964 B1 | 12/2002 | Muthu et al. |
| 6,528,954 B1 | 3/2003 | Lys et al. |
| 6,548,967 B1 | 4/2003 | Dowling et al. |
| 6,577,080 B2 | 6/2003 | Lys et al. |
| 6,583,550 B2 | 6/2003 | Iwasa et al. |
| 6,624,597 B2 | 9/2003 | Dowling et al. |
| 6,636,003 B2 | 10/2003 | Rahm et al. |
| 6,688,753 B2 | 2/2004 | Calon et al. |
| 6,717,376 B2 | 4/2004 | Lys et al. |
| 6,753,661 B2 | 6/2004 | Muthu et al. |
| 6,756,772 B2 | 6/2004 | McGinnis |
| 6,774,584 B2 | 8/2004 | Lys et al. |
| 6,777,891 B2 | 8/2004 | Lys et al. |
| 6,781,329 B2 | 8/2004 | Mueller et al. |
| 6,788,011 B2 | 9/2004 | Mueller et al. |
| 6,806,659 B1 | 10/2004 | Mueller et al. |
| 6,869,204 B2 | 3/2005 | Morgan et al. |
| 6,888,322 B2 | 5/2005 | Dowling et al. |
| 6,897,624 B2 | 5/2005 | Lys et al. |
| 6,936,978 B2 | 8/2005 | Morgan et al. |
| 6,958,920 B2 | 10/2005 | Mednik et al. |
| 6,965,205 B2 | 11/2005 | Piepgras et al. |
| 6,967,448 B2 | 11/2005 | Morgan et al. |
| 6,969,954 B2 | 11/2005 | Lys |
| 6,975,079 B2 | 12/2005 | Lys et al. |
| 7,014,336 B1 | 3/2006 | Ducharme et al. |
| 7,038,398 B1 | 5/2006 | Lys et al. |
| 7,038,399 B2 | 5/2006 | Lys et al. |
| 7,042,172 B2 | 5/2006 | Dowling et al. |
| 7,064,498 B2 | 6/2006 | Dowling et al. |
| 7,088,059 B2 | 8/2006 | McKinney et al. |
| 7,113,541 B1 | 9/2006 | Lys et al. |
| 7,116,294 B2 * | 10/2006 | Stopa ............................ 345/82 |
| 7,135,824 B2 | 11/2006 | Lys et al. |
| 7,139,617 B1 | 11/2006 | Morgan et al. |
| 7,161,311 B2 | 1/2007 | Mueller et al. |
| 7,161,313 B2 | 1/2007 | Piepgras et al. |
| 7,161,556 B2 | 1/2007 | Morgan et al. |
| 7,180,252 B2 | 2/2007 | Lys et al. |
| 7,186,003 B2 | 3/2007 | Dowling et al. |
| 7,187,141 B2 | 3/2007 | Mueller et al. |
| 7,202,613 B2 | 4/2007 | Morgan et al. |
| 7,221,104 B2 | 5/2007 | Lys et al. |
| 7,233,115 B2 | 6/2007 | Lys |
| 7,242,152 B2 | 7/2007 | Dowling et al. |
| 7,246,919 B2 | 7/2007 | Porchia et al. |
| 7,248,239 B2 | 7/2007 | Dowling et al. |
| 7,253,566 B2 | 8/2007 | Lys et al. |
| 7,255,457 B2 | 8/2007 | Ducharme et al. |
| 7,256,554 B2 | 8/2007 | Lys |
| 7,274,160 B2 | 9/2007 | Mueller et al. |
| 7,288,902 B1 | 10/2007 | Melanson |
| 7,300,192 B2 | 11/2007 | Mueller et al. |
| 7,308,296 B2 | 12/2007 | Lys et al. |
| 7,309,965 B2 | 12/2007 | Dowling et al. |
| 7,375,476 B2 | 5/2008 | Walker et al. |
| 7,511,437 B2 | 3/2009 | Lys et al. |
| 7,649,326 B2 * | 1/2010 | Johnson et al. ............... 315/291 |
| 2002/0145041 A1 | 10/2002 | Muthu et al. |
| 2004/0085030 A1 | 5/2004 | Laflamme et al. |
| 2004/0169477 A1 | 9/2004 | Yanai |
| 2004/0212321 A1 | 10/2004 | Lys et al. |
| 2005/0218838 A1 | 10/2005 | Lys |
| 2005/0231459 A1 * | 10/2005 | Furukawa ..................... 345/102 |
| 2005/0243022 A1 * | 11/2005 | Negru ............................ 345/46 |
| 2005/0253533 A1 | 11/2005 | Lys et al. |
| 2006/0023002 A1 | 2/2006 | Hara et al. |
| 2006/0125420 A1 | 6/2006 | Boone et al. |
| 2006/0226795 A1 | 10/2006 | Walter et al. |
| 2006/0232219 A1 * | 10/2006 | Xu ............................ 315/209 R |
| 2006/0243022 A1 | 11/2006 | Jones |
| 2006/0244396 A1 | 11/2006 | Bucur |
| 2007/0029946 A1 | 2/2007 | Yu et al. |
| 2007/0126656 A1 | 6/2007 | Huang et al. |
| 2007/0262724 A1 * | 11/2007 | Mednik et al. ................ 315/125 |
| 2008/0012502 A1 | 1/2008 | Lys |
| 2008/0018261 A1 | 1/2008 | Kastner |
| 2008/0054815 A1 | 3/2008 | Kotikalapoodi et al. |
| 2008/0116818 A1 | 5/2008 | Shteynbert et al. |
| 2008/0224635 A1 | 9/2008 | Hayes |
| 2009/0218960 A1 | 9/2009 | Lyons et al. |

FOREIGN PATENT DOCUMENTS

| | | |
|---|---|---|
| WO | 02091805 A2 | 11/2002 |
| WO | 2007026170 A2 | 3/2007 |
| WO | 2011061505 | 5/2011 |

OTHER PUBLICATIONS

International Preliminary Report on Patentability and Written Opinion of the International Searching Authority for PCT/US2008/074133, dated Mar. 4, 2010.

Dyble, et al, Impact of Dimming White LEDS: Chromaticity Shifts in High-Power White LED Systems Due to Different Dimming Methods, International Society of OpticalEngineers, 2005, Fifth International Conference on Solid State Lighting, Proceedings of SPIE 5941: 291-299, Troy, NY, USA.

Color Temperature, www.sizes.com/units/color temperature.htm, printed Mar. 27, 2007.

Linear Technology, Triple Output LED Driver, Datasheet LT3496, Linear Technology Corporation, LT 0510 Rev F, 2007, Milpitas, CA, USA.

Dilouie, Craig, Introducing the LED Driver, Electrical Construction & Maintenance (EC&M), Sep. 1, 2004, ,pp. 28-32, Zing Communications, Inc., Calgary, Alberda, Canada.

Wikipedia, Light-Emitting Diode, http://en.wikipedia.org/wiki/Light-emitting_diode, printed Mar. 27, 2007.

Linear Technology, News Release, Triple Output LED Driver Drives Up to 24×500mA Leds & Offers 3,000:1 True Color PWM Dimming, Mar. 24, 2007, Milpitas, CA, USA.

Ohno, Yoshi, Spectral Design Considerations for White LED Color Rendering, Optical Engineering, vol. 44, Issue 11, Special Section on Solid State Lighting, Nov. 30, 2005, Gaithersburg, MD, USA.

* cited by examiner

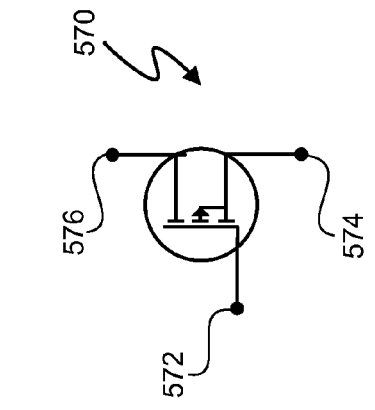
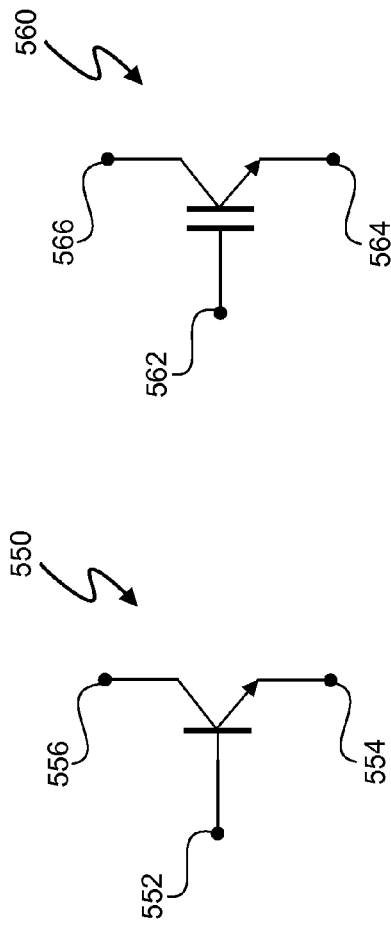
*Figure 5A*
*Figure 5B*
*Figure 5C*
*Figure 5D*
*Figure 5E*

MULTI-LED CONTROL

CROSS REFERENCE TO RELATED APPLICATIONS

This application claims the benefit under 35 U.S.C. §119 (e) and 37 C.F.R. §1.78 of U.S. Provisional Application No. 60/957,753, filed Aug. 24, 2007 and entitled "Multi-LED Control." U.S. Provisional Application No. 60/957,753 includes exemplary systems and methods and is incorporated by reference in its entirety.

BACKGROUND OF THE INVENTION

1. Field of the Invention

The present invention relates in general to the field of electronics and lighting, and more specifically to a system and method to controlling and/or providing power to current regulated light sources, such as light emitting diode light sources.

2. Description of the Related Art

Commercially practical incandescent light bulbs have been available for over 100 years. However, other light sources show promise as commercially viable alternatives to the incandescent light bulb. Light emitting diodes (LEDs) are becoming particularly attractive as main stream light sources in part because of energy savings through high efficiency light output, long life, and environmental incentives such as the reduction of mercury. The efficiency and intensity of LEDs continues to improve. Multiple applications exist for LEDs, and the number of applications continues to increase. For example, LEDs can be used for ordinary indoors and outdoors illumination, television backlighting, large form-factor video displays, etc.

LEDs are semiconductor devices and are driven by direct current. The intensity of the LED varies in direct proportion to the current flowing through the LED. Thus, increasing current supplied to an LED increases the intensity of the LED and decreasing current supplied to the LED dims the LED.

FIG. 1 depicts a multi-channel LED driver and controller system 100 that controls current in parallel connected LEDs. The LED driver and controller system 100 includes 16-channel LED drivers 102.0 through 102.M (collectively referred to as "LED drivers 102"), where M+1 represents the number of LED drivers 102 in LED driver and controller system 100 and M is a positive number. LED controller 104 controls the LED drivers 102. LED driver 102.0 includes 16 output control signals $OUT_0$-$OUT_{15}$ generated by I/O and controller 103.0 to control conductivity of respective switches 106.0-106.15. In at least one embodiment, switches 106.0-106.15 are bipolar junction transistors.

The switches 106.0-106.15 are respectively connected in series with LEDs 108.0-108.15. Thus, when switches 106.0-106.15 conduct, LED currents $i_{L0}$-$i_{L15}$ flow through respective LEDs 108.0-108.15. The LEDs 106.0-106.15 can be individually controlled by individually controlling the conductivity of respective switches 106.0-106.15. The output control signals $OUT_0$-$OUT_{15}$ are pulse width modulated signals. Controlling the pulse widths of output control signals $OUT_0$-$OUT_{15}$ controls the respective averages of respective LED currents $i_{L0.0}$-$i_{L15.0}$ for respective LEDs 108.0-108.15 and LED currents $i_{L0.M}$-$i_{L15.M}$ for respective LEDs 112.0-112.15. Controlling the respective averages of respective LED currents $i_{L0}$-$i_{L15}$ controls the intensity of respective LEDs 108.0-108.15. LEDs 108.0-108.15 can be color mixed with red, green, and blue LEDs. Including multi-colored combinations of LEDs 108.0-108.15 and coordinating the pulse widths of output control signals allows multi-channel LED driver and controller system 100 to generate a large array of colors and intensity of LEDs 108.-108.15. The configuration of LED driver 102.0 is repeated by the M LED drivers 102. For example, LED driver 102.M includes output signals $OUT_0$-$OUT_{15}$ and switches 110.0-110.15 to control LED currents in LEDs 112.0-112.15.

LED controller 104 can coordinate control of output signals $OUT_0$-$OUT_{15}$ for LED drivers 102.0-102.15 by providing data directly to the LED drivers 102.0-102.15 via respective parallel data buses 114.0-114.15. The LED controller provides serial data to LED driver 102.0 via serial data line 115.0. The LED driver and controller system 100 also includes serial data bus 115.1-115.15 that provide serial data from one LED driver to the next LED driver and finally back to LED controller 104 from LED driver 102.M via serial data bus 115.16.

Texas Instruments, Inc.'s part number TLC5940 represents one example of an LED driver, such as each of LED drivers 102. The data sheet for the TLC5940 16-channel LED driver describes functionality of the TLC5940 and an exemplary configuration of LED driver and controller system 100. The data sheet for the TLC5940 is entitled "16 Channel LED Driver with DOT Correction and Grayscale PWM Control", dated December 2004-revised October 2007, is available from Texas Instruments, Inc., a Texas, USA, corporation.

Because all of LEDs connected to an LED driver in LED driver and controller system 100 are connected in parallel, the LED currents $i_{L0}$-$i_{L15}$ for each of LED drivers 102 are relatively high. Additionally, each of LED drivers 102 has a voltage drop, such as 1-1.5 volts. Thus, LED driver and controller system 100 generally has a low system efficiency. It would be desirable to, for example, improve the efficiency of LED driver and controller system 100.

SUMMARY OF THE INVENTION

In one embodiment of the present invention, an apparatus for controlling multiple, series coupled light emitting diodes (LEDs) includes a first LED driver to generate:
 a first switch control signal to control a duty cycle of a first switch coupled in parallel across at least a first LED; and
 a second switch control signal to control a duty cycle of a second switch coupled to at least a second LED to vary a relative intensity of the first and second LEDs, wherein the first LED is coupled in series with the second LED.

In another embodiment of the present invention, a method for controlling multiple, series coupled light emitting diodes (LEDs) includes generating a first switch control signal to control a duty cycle of a first switch coupled in parallel across at least a first LED. The method also includes generating a second switch control signal to control a duty cycle of a second switch coupled to at least a second LED to vary a relative intensity of the first and second LEDs, wherein the first LED is coupled in series with the second LED.

BRIEF DESCRIPTION OF THE DRAWINGS

The present invention may be better understood, and its numerous objects, features and advantages made apparent to those skilled in the art by referencing the accompanying drawings. The use of the same reference number throughout the several figures designates a like or similar element.

FIGS. 5A, 5B, 5C, 5D, and 5E depict various switches.

DETAILED DESCRIPTION

A LED driver and controller system utilizes switches to parallel connect to respective sets of one or more LEDs and a current source to provide efficient control of the LEDs. In at least one embodiment, the LEDs are connected in series. An LED controller of the LED driver and controller system 200 controls conductivity of the switches. In at least one embodiment, the LED controller provides control signals to one or more LED drivers. The LED drivers receive the control signals and, in response to the control signals, control the conductivity of each switch. In at least one embodiment, the conductivity of the each switch is controlled using a duty cycle modulated control signal. In at least one embodiment, the duty cycle modulated control signal is a pulse width modulated control signal. In another embodiment, the duty cycle modulated control signal is a pulse density modulated control signal.

Because each switch is connected in a parallel to one or more LEDs, when the switch conducts, the one or more LEDs are shunted, thus, turning the one or more LEDs "OFF". When the switch is non-conductive, the current flows through the one or more LEDs that are parallel connected to the switch, and the one or more LEDs illuminate. The LED driver and controller system 200 can include multiple LED drivers to connect to multiple strings of LEDs.

Figure 1:
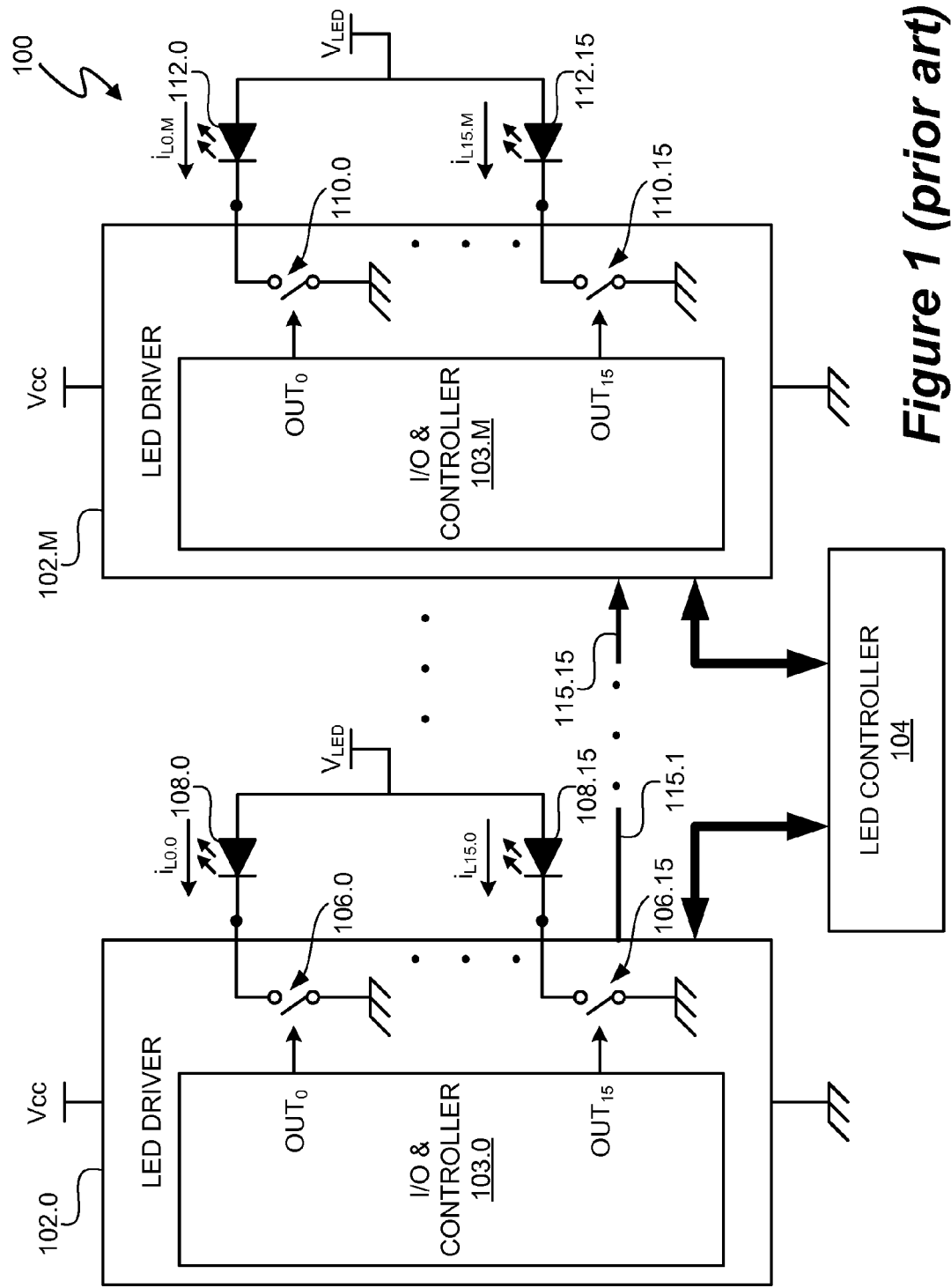
FIG. 1 (labeled prior art) depicts a LED driver and controller system with parallel connected LEDs.

In at least one embodiment, the current source is a constant current source that provides an LED drive current to all of the LED strings connected to all of the LED drivers of LED driver and controller system. Varying the LED current varies the overall intensity of the LEDs. Varying the duty cycle of the switches connected in parallel to one or more LEDs varies the color of the LEDs. In at least one embodiment, red, green, and blue LEDs are connected in series and controlled by the LED controller to generate a wide spectrum of colors. In at least one embodiment, a red diode, green diode, and blue diode are configured in close proximity to each other to generate one pixel of an LED based display. In at least one embodiment, the LED driver and controller system utilizes a higher LED voltage $V_{LED}$ and lower current relative to conventional systems such as LED driver and controller system 100 (FIG. 1). Lower current drops across components result in less power drop, availability of smaller components, etc. to, for example, increase system efficiency and lower system cost.

Figure 2:
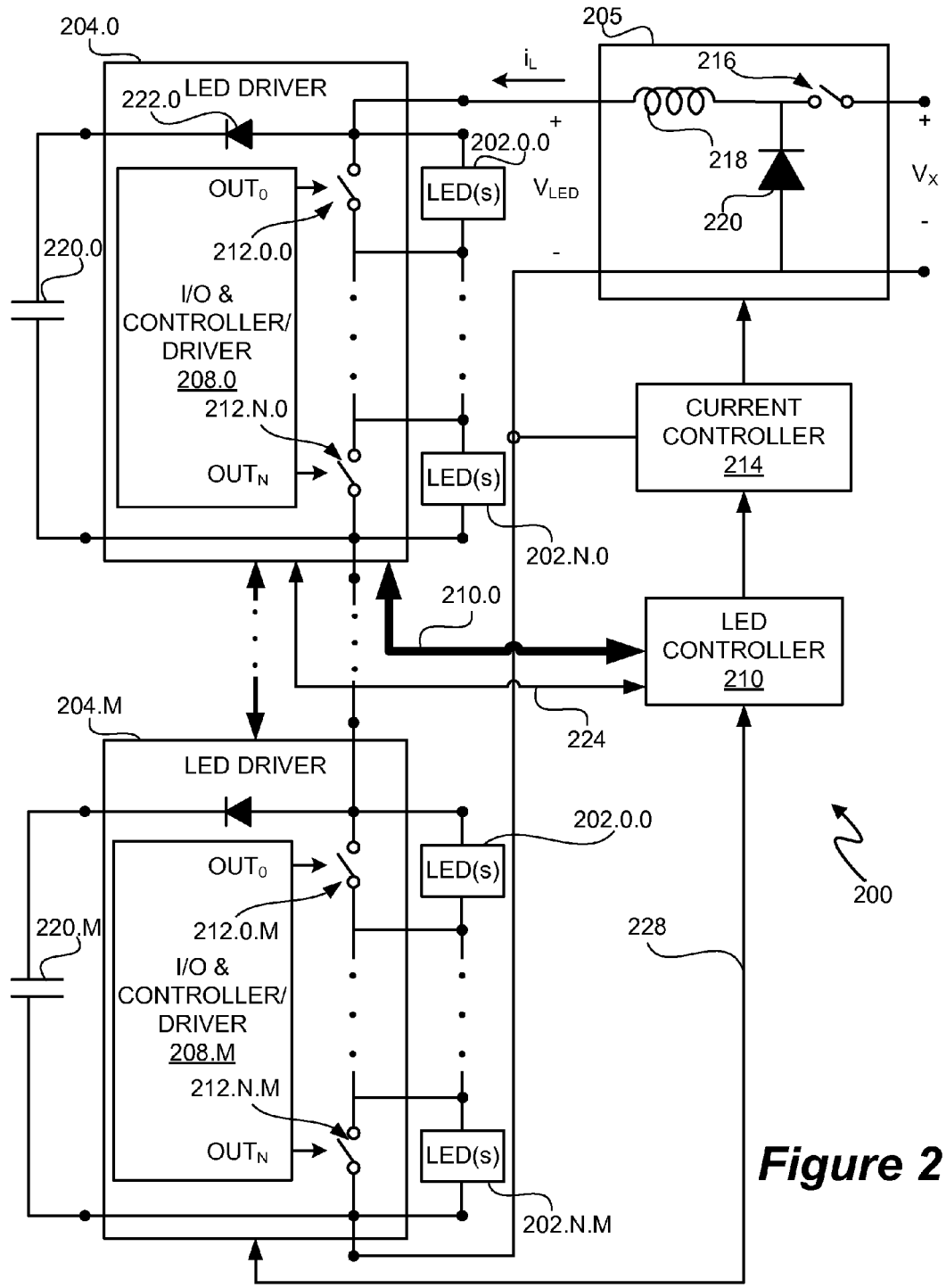
FIG. 2 depicts a LED driver and controller system 100 with serial connected LEDs and a constant current source.

FIG. 2 depicts an exemplary LED driver and controller system 200 to control multiple LEDs. The LED driver and controller system 200 includes LEDs 202.0.0-202.N.M. Each LED driver 204.0-204.M includes nodes to connect to a respective string of respective LEDs 202.0.0-202.N.0 through 202.0.M-202.N.M. For example, LED driver 204.0 includes nodes to connect to a string of LEDs consisting of LEDs 202.0.0-202.N.0. "N" represents the number of channels in each LED driver 204.0-204.M, and "M" represents the number of LED drivers. N is an index and, in at least one embodiment, is any positive integer. M is also an index, and, in at least one embodiment, is any positive integer. In one embodiment, N is greater than or equal to 6. In another embodiment, LEDs 202.0.0-202.N.0 through 202.0.M-202.N.M are incorporated into an LED color display, and N equals 12, and each group of 3 LEDs consists of a red diode, a green diode, and a blue diode. In one embodiment, N equals 13. In at least one embodiment, LEDs 202.0.0-202.N.0 through 202.0.M-202.N.M are incorporated into one or more light fixtures such as interior or exterior light fixtures. In at least one embodiment, LEDs 202.0.0-202.N.0 through 202.0.M-202.N.M are incorporated into one or more signs or other displays, such as a programmable electronic display available from Daktronics of South Dakota, USA. Each set of LEDs, such as LED 202.0.0, includes one or more LEDs. If the set of LEDs includes multiple LEDs, the multiple LEDs in the set of LEDs can be connected using serial, parallel, or serial and parallel connections. Although the term "connect" is used to indicate connections of component to components, it will be understood that components can also be "coupled" to each other indirectly through intermediary components.

LED drivers 204.0-204.M include a set of N+1 respective switches 206.0.0-206.N.0 through 206.0.M-206.N.M. The following description focuses on LED driver 204.0, and the description is applicable to all LED drivers 204. LED driver 204.0 includes an I/O controller/driver 208.0. The I/O and controller/driver 208.0 receives control data from LED controller 210 via bus 210.0. In at least one embodiment, the control data provides data to LED driver 204.0 to allow LED driver 204.0 to control the LED current $i_L$ through each of LEDs 202.0.0-202.N.0. LED driver 204.0 includes nodes to allow respective LEDs 202.0.0-202.N.0 to connect in series with each other. In at least one embodiment, LED driver 204.0 also includes a serial data interface to receive serial data from LED controller 210 via serial data bus 224. The serial data can be passed from LED driver 204.0 to 204.1, from LED driver 204.1 to LED driver 204.2, and so on via serial data buses 226.0-226.M and returned to LED controller 210 via serial bus 228 for, for example, additional control of LED drivers 204.0-204.M. Each of LEDs 202.0.0-202.N.0 is also connected in parallel with a respective one of switches 212.0.0-212.N.0. For example, LED 202.0.0 is connected in parallel with switch 212.0.0 and LED 202.N.0 is connected in parallel with switch 212.N.0, and so on. When a switch 212.x.y is non-conductive, LED current $i_L$ flows through LEDs 202.x.y, where "x" is an index representing any respective index between 0 and N, and "y" is an index representing any respective index between and 0 and M. When a switch 212.x.y is conductive, the switch 212.x.y shunts LEDs 212.x.y, and the LED current $i_L$ bypasses the LEDs 212.x.y. When the LED current $i_L$ bypasses the LEDs 212.x.y, the set of LEDs 212.x.y is OFF. In at least one embodiment, LED drivers 204.0-204.M are integrated circuits. In at least one embodiment, switches 212 are integrated as part of LED drivers 204.0-204.M. In at least one embodiment, switches 212 are connected externally to nodes of LED drivers 204.0-204.M.

In at least one embodiment, constant current source 205 provides an LED current $i_L$. In at least one embodiment, the constant current source 205 is a buck-type switching power converter. The constant current source 205 can be another type of source, such as a boost-buck switching power converter. The constant current source 205 receives an input voltage $V_X$. In at least one embodiment, voltage $V_X$ is a full rectified sin wave version of a 60 Hz/120 V mains voltage in the United States of America or a 50 Hz/230 V mains voltage in Europe. A current controller 214 modulates the conductivity of switch 216, which in turn controls the value of LED current $i_L$. In at least one embodiment, the term "constant LED current" does not imply that the LED current $i_L$ cannot vary or be varied. In at least one embodiment, the LED current $i_L$ varies in response to input voltage changes and load changes. In at least one embodiment, the current controller 214 monitors the LED current $i_L$ and adjusts the modulation of switch 216 to provide the desired LED current $i_L$. Thus, in at least one embodiment, the constant current source 205 is controlled to provide an LED current $i_L$ that is adjusted with an attempt to match a target current. Additionally, the LED current $i_L$ can be intentionally raised and lowered to, for example, adjust the overall intensity of LEDs 202.0.0-202.N.M.

When switch 216 is closed, the inductor 218 is energized, diode 220 is reverse biased, capacitors 220.0-220.M are charged, and diodes 222.0-222.M are forward biased. When the switch 216 is open, the voltage polarity of inductor 218 reverses, and diode 220 is forward biased. The current controller senses current $i_L$ and controls switch 216 to maintain a constant LED current $i_L$. In at least one embodiment, the current controller 214 also senses the input voltage $V_X$ to adjust the modulation of switch 216 to maintain a constant LED current $i_L$. Since the intensity of LEDs varies with the amount of current, changing the LED current $i_L$ can be used to change the intensity of LEDs 202.0.0-202.N.M. Control methodologies for buck converters are well-known. In at least one embodiment, LED controller 210 provides a data input signal D to current controller 214 that directly indicates the current level for LED current $i_L$ or indicates a desired intensity of LEDs 202.0.0-202.N.M. The current controller 214 responds by adjusting the LED current $i_L$ in accordance with the data control signal D. In at least one embodiment, the current controller 214 also provides power factor correction. U.S. patent application Ser. No. 12/047,262, filed on Mar. 12, 2008, entitled "Power Control System For Current Regulated Light Sources", inventor John L. Melanson, describes an example buck converter and is incorporated herein by reference in its entirety.

The LED driver and controller system 200 can be used to generate a wide spectrum of colors. The colors of LEDs 202.0.0-202.N.M can be selected and the conductivity of switches 212.0.0-212.N.M can be controlled to control colors generated by LED driver and controller system 200. In at least one embodiment, LEDs are serially connected in combinations of red, green, and blue diodes. As described in more detail below, by coordinating the conductivity of the switches 212 connected across of a group of red, green, and blue diodes, the color mixing of the red, green, and blue diodes can generated a wide spectrum of colors.

The LED controller 210 can utilize any of a variety of algorithms to coordinate control of switches 212.0.0-212.N.M and level of LED current $i_L$ to control the intensity and color generated by LED driver and controller system 200. For example, in at least one embodiment, the LEDs 202.0.0-212.N.M include red, green, and blue diodes. To generate only the color red, LED controller provides control data to LED drivers 204.0-204.M to cause all switches 212 that are parallel coupled across green and blue diodes to shunt the green and blue diodes. Only the red diodes are "ON", and, thus, only the color red is generated by LED driver and controller system 200. The same process can be used to generate only blue and green. A full spectrum of colors can be generated by coordinating the modulated shunting of groups of red, green, and blue diodes in accordance with a desired color. Groups of red, green, and blue diodes can be physically configured to provide respective display pixels. For example, to obtain a color corresponding to full red, ½ blue, and ½ green, the switches connected across the red, blue, and green diodes can be controlled such that the switch across the full red diode is always 'off' (i.e. duty cycle of 0) and the switches across the blue and green diodes each have a duty cycle of ½. In at least one embodiment, the pulses of the switches connected across the blue and green diodes are alternated to maintain an approximately constant power consumption. In another example, to obtain a color corresponding to ½ red, ¼ blue, and ¼ green, the switches connected across the red, blue, and green diodes can be controlled such that the switch across the full red diode has a duty cycle of ½, and the switches across the blue and green diodes each have a duty cycle of ¾. In at least one embodiment, the current level of LED current it is generated to be $i_L$ times the quantity (1 minus the minimum duty cycle of the LED with lowest duty cycle for a given color), the LED with the lowest duty cycle for the given color is set to 0, and the LEDs with higher duty cycles are decreased by the same amount that the LED with the lowest duty cycle is decreased. For example, to obtain a color corresponding to ½ red, ¼ blue, and ¼ green, the switches connected across the red, blue, and green diodes can be controlled such that the switch across the full red diode is always 'off' (i.e. duty cycle of 0), the switches across the blue and green diodes each have a duty cycle of ¼, i.e. ¾−½=¼), and the LED current $i_L$ is reduced by ½=(1−½). In at least one embodiment, other color diodes are used in conjunction with or in place of red, green, and blue diodes. For example, white diodes can be included to provide white light illumination.

Figure 3:
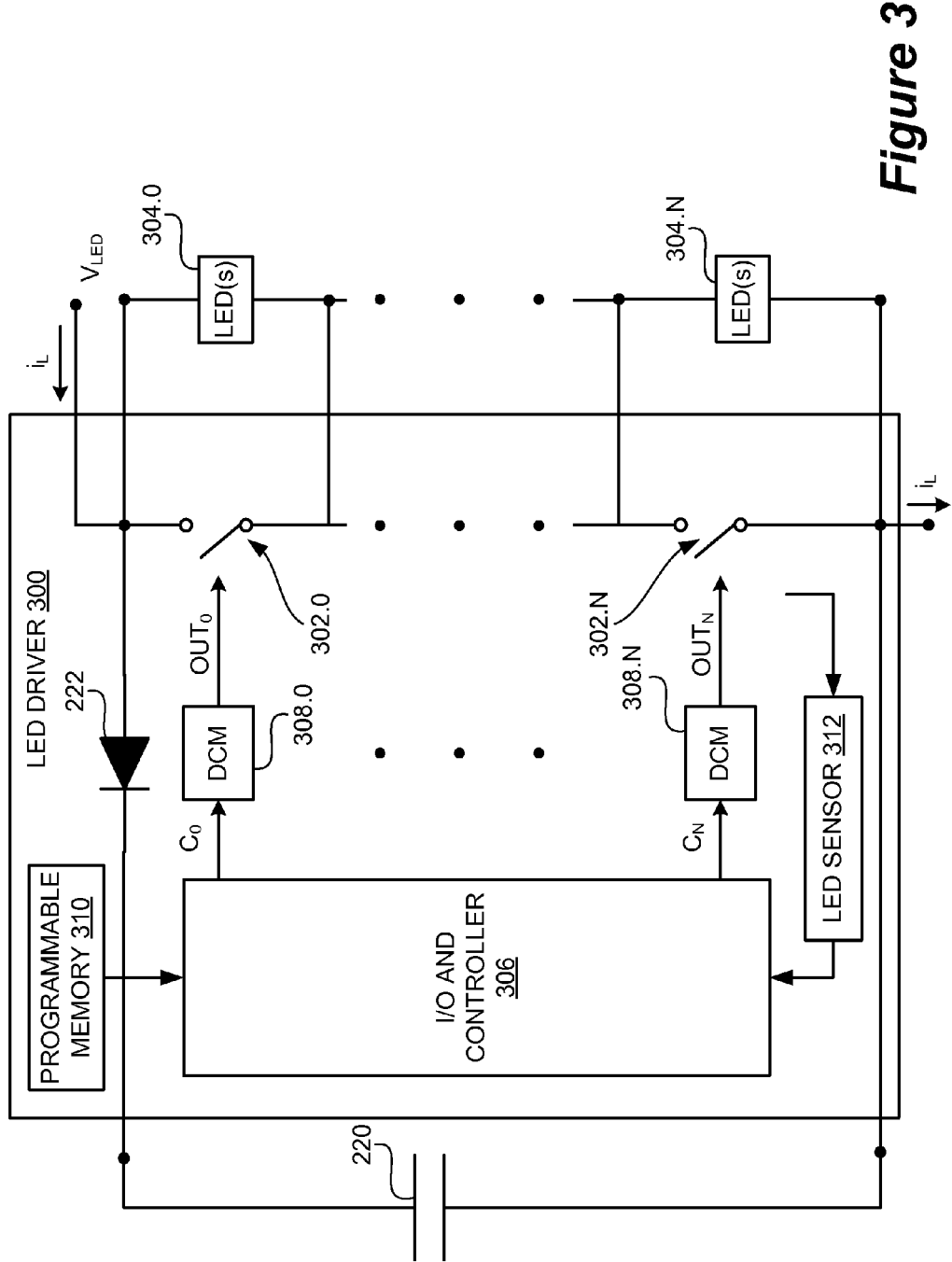
FIG. 3 depicts an LED driver.

FIG. 3 depicts LED driver 300, which represents one embodiment of LED driver 204.x. LED driver 300 includes switches 302.0-302.N. Each of switches 302.0-302.N is connected in parallel to a respective set of LEDs 304.0-304.N. The I/O and controller 306 generates input signals $C_0$-$C_N$ for respective duty cycle modulators 308.0-308.N. The duty cycle modulators 308.0-308.N convert the input signals $C_0$-$C_N$ into a duty cycle modulated output signals $OUT_0$-$OUT_N$. The duty cycle modulated output signals $OUT_0$-$OUT_N$ can be of any duty cycle modulated form, such as pulse width modulated signals or pulse density modulated signals. The switches 302.0-302.N conduct in accordance with the value of respective duty cycle modulated output signals $OUT_0$-$OUT_N$. For example, if switches 302.0-302.N are n-channel field effect transistors (FETs), when duty cycle modulated output signals $OUT_0$-$OUT_N$ are a logical "1", switches 302.0-302.N conduct and shunt LEDs 304.0-304.N. When duty cycle modulated output signals $OUT_0$-$OUT_N$ are a logical "0", switches 302.0-302.N are non-conductive, and LEDs 304.0-304.N are "on". Thus, modulating switches 302.0-302.N controls the current flow through respective LEDs 304.0-304.N. In at least one embodiment, the I/O and controller 306 receives control data from LED controller 210. The I/O and controller 306 controls the conductivity of each of LEDs 304 in accordance with the control data received from LED controller 210.

In at least one embodiment, the LED driver 300 includes an optional a programmable memory 310. The programmable memory 310 can include, for example, registers that contain control data for I/O and controller 306. The programmable memory 310 can be coupled to the LED controller 210 to receive control data from LED controller 210. The control data can, for example, indicate a particular register or registers within programmable memory 310. The programmable memory 310 can then provide the contents of the registers to I/O controller 306. The provided contents serve as control signals for IO and controller 306 to responsively control the conductivity and, thus, the 'on' times of LEDs 304.0-304.N.

In at least one embodiment, the LED driver 300 includes an optional LED sensor 312. The LED sensor 312 is configured to sense when an LED is malfunctioning. For example, in at least one embodiment, LED sensor 312 includes a current sensor coupled to each LED. When the switch 302.x connected across LEDs 304.x is nonconductive, current should flow through LEDs 304.x, and the voltage across LEDs 304.x should be a known quantity. In at least one embodiment, the LED sensor 312 detects the voltage drop across each of LEDs 304.x or across multiple sets of multiple LEDs 304. If the voltage across the LEDs 304.x exceeds a predetermined 'normal' voltage, LED sensor 312 informs LED controller 210, and LED controller 210 takes corrective action such as shunting the LEDs 304.x that exhibit excessive voltage drop. If no current flows in the LEDs 304.x when the switch 302.x is nonconductive, However, if current does not flow through LEDs 304.x, LED sensor 312 informs LED controller 210, and LED controller 210 takes corrective action such as shunting the LEDs 304.x that exhibit low current flow. In at least one embodiment, LED controller 210 can, for example, provide an indication to a device (not shown) that the LED 304.x is malfunctioning or take other available corrective action.

Figure 4:
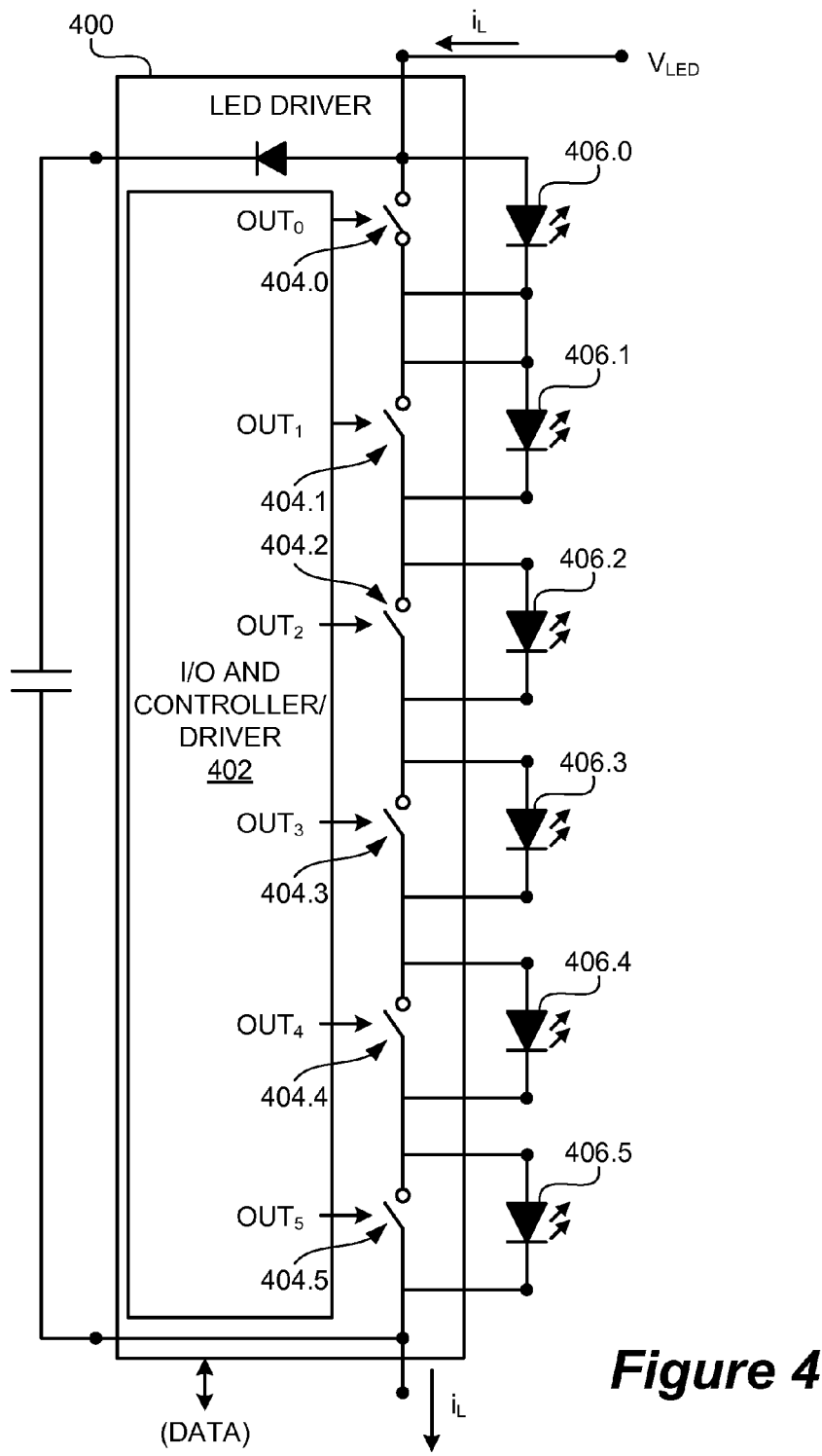
FIG. 4 depicts another LED driver.

FIG. 4 depicts LED driver 400, which represents one embodiment of LED driver 204.x. LED driver 400 includes an I/O and controller/driver 402 to generate 6 duty cycle modulated output signals $OUT_0$-$OUT_5$ in accordance with DATA received from LED controller 210 and, in at least one embodiment, other LED drivers. The duty cycle modulated output signals $OUT_0$-$OUT_5$ control respective switches 404.0-404.5. Switches 404.0 is parallel connected across LED 406.0, switch 404.1 is parallel connected across LED 406.1, and so on so that switches 404.0-404.5 are parallel connected across respective LEDs 406.0-406.5. When switch 404.0 conducts, LED 406.0 is shunted so that LED current $i_L$ bypasses LED 406.0. In at least one embodiment, when LED 406.0 is bypassed, LED 406.0 is 'off'. When switch 404.1 conducts, LED 406.1 is shunted so that LED current $i_L$ bypasses LED 406.1. In at least one embodiment, when LED 406.1 is bypassed, LED 406.1 is 'off', and so on for each of switches 404.2-404.5 and LEDs 406.2-406.5.

FIGS. 5A, 5B, 5C, 5D, and 5E depict exemplary embodiments of switches 212 and 404. Referring to FIG. 5A, the nodes of 532, 534, and 536 of generic switch 530 represent respective control, common, and switching nodes. FIGS. 5B, 5C, and 5D represent embodiments of switch 530. Referring to FIG. 5B, switch 540 is an n-channel MOSFET, and gate node 542, source node 544, and drain node 546 respectively represent a control node, a common node, and a switching node. Referring to FIG. 5C, switch 550 is a bipolar junction transistor (BJT), and base node 552, emitter node 554, and collector 556 respectively represent a control node, a common node, and a switching node. Referring to FIG. 5D, switch 560 is an insulated gate bipolar transistor (IGBT), and gate node 562, emitter node 564, and collector 566 respectively represent a control node, a common node, and a switching node. Referring to FIG. 5E, switch 570 is a p-channel MOSFET, and gate node 572, drain node 574, and source node 576 respectively represent a control node, a common node, and a switching node.

Figure 6:
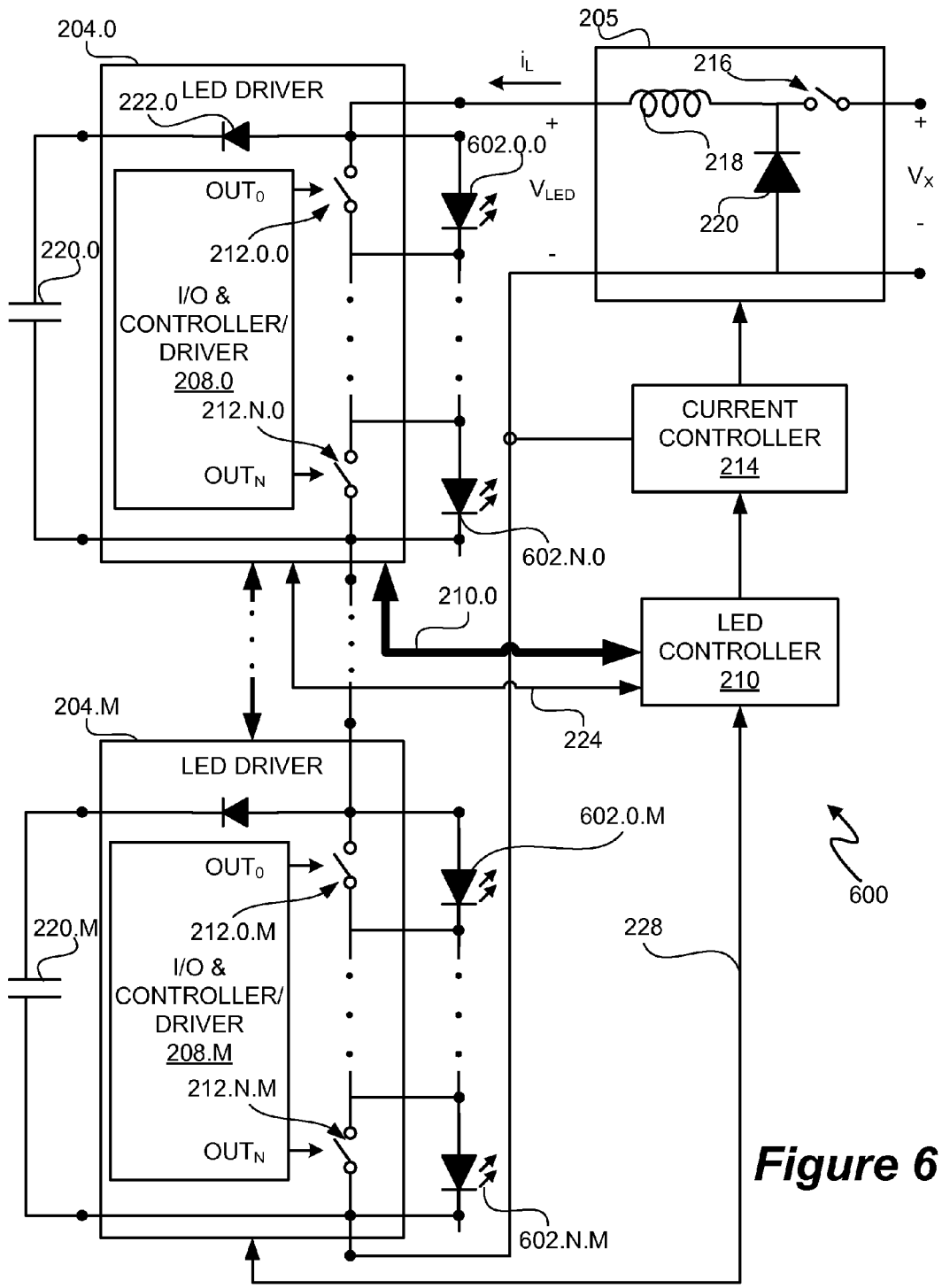
FIG. 6 depicts a LED driver and controller system, which is one embodiment of the LED driver and controller system of FIG. 2.

FIG. 6 depicts LED driver and controller system 600, which represents an exemplary embodiment of LED driver and controller system 200 where each of LEDs 202.0.0-202.N.M is represented by a single LED 602.0.0-602.N.M.

In at least one embodiment, the LED driver and controller system 200 is configured as one or more integrated circuits and/or discrete devices. The particular packaging and groupings of components and subsystems of LED driver and controller system 200 is a matter of design choice.

Although the present invention has been described in detail, it should be understood that various changes, substitutions and alterations can be made hereto without departing from the spirit and scope of the invention as defined by the appended claims.

What is claimed is:

1. An apparatus for controlling multiple, series coupled light emitting diodes (LEDs), the apparatus comprising:
   a first LED driver to generate:
      a first switch control signal to control a duty cycle of a first switch coupled in parallel across at least a first LED; and
      a second switch control signal to control a duty cycle of a second switch coupled to at least a second LED to vary a relative intensity of the first and second LEDs, wherein the first LED is coupled in series with the second LED;
   a buck-type constant current source coupled to the first switch to provide a bias current for the first and second LEDs, wherein the buck-type constant current source includes an inductor and further includes a voltage source coupling switch to receive a control signal from a current controller to control coupling of an input voltage source to the inductor; and
   a second LED driver to generate:
      a third switch control signal to control a duty cycle of a third switch coupled in parallel across at least a third LED; and
      a fourth switch control signal to control a duty cycle of a fourth switch coupled to at least a fourth LED to vary a relative intensity of the third and fourth LEDs, wherein the third LED is coupled in series with the fourth LED.

2. The apparatus of claim 1 further comprising:
   an LED controller coupled to the LED driver to generate and provide data to the first LED driver to control generation of the first and second switch control signals.

3. The apparatus of claim 1 wherein the second switch is coupled in parallel with the second LED.

4. The apparatus of claim 1 wherein the first LED driver is further configured to generate N additional control signals to control duty cycles of N additional switches, wherein each of the N additional switches is coupled in parallel with at least one LED, each LED, including the first and second LEDs, are coupled in series, and N is an integer greater than or equal to one.

5. The apparatus of claim 1 wherein the first switch control signal controls shunting of the first LED further comprising:
   a current controller to generate a control signal to control an LED current flowing through the first and second LEDs, wherein an intensity of the first and second LEDs is controlled by varying a level of the LED current and color mixing of the first and second LEDs is controlled by varying duty cycles of the respective first and second switches.

6. The apparatus of claim 1 further comprising an LED sensor coupled to at least the first LED to detect malfunctions of the first LED.

7. The apparatus of claim 6 wherein the LED sensor is further configured to shunt the first LED with the first switch upon any detection of a malfunction of the first LED.

8. The apparatus of claim 1 further comprising:
   an LED controller coupled to the first LED driver to generate and provide first control data to the first LED driver to control generation of the first and second switch control signals;
   wherein the first LED driver is coupled to the LED controller and the second LED driver, and the second LED driver receives second control data from the LED controller via the first LED driver.

9. The apparatus of claim 8 wherein the first LED driver is configured to provide the second control data serially to the second LED driver.

10. The apparatus of claim 1 wherein the first LED driver is further configured to generate a third switch control signal to control a duty cycle of a third switch coupled to at least a third LED to vary a relative intensity of the first, second, and third, wherein the first, second, and third LEDs are coupled in series, the second switch is coupled in parallel with the second LED, the third switch is coupled in parallel with the third LED, the first LED is a red LED, the second LED is a green LED, the third LED is a blue LED, and the LED driver is further configured to vary a duty cycle of the first, second, and third switches to vary colors generated by color mixing of the first, second, and third LEDs.

11. The apparatus of claim 1 wherein to control the duty cycle of the first switch comprises generating a pulse width modulated first switch control signal and to control the duty cycle of the second switch comprises generating a pulse width modulated second switch control signal.

12. The apparatus of claim 1 wherein to control the duty cycle of the first switch comprises generating a pulse width density modulated first switch control signal and to control the duty cycle of the second switch comprises generating a pulse width density modulated second switch control signal.

13. The apparatus of claim 4 wherein N is selected from group consisting of: greater than or equal to 6, 12, and 13.

14. A method for controlling multiple, series coupled light emitting diodes (LEDs), the method comprising:
generating a first switch control signal to control a duty cycle of a first switch coupled in parallel across at least a first LED;
generating a second switch control signal to control a duty cycle of a second switch coupled to at least a second LED to vary a relative intensity of the first and second LEDs, wherein the first LED is coupled in series with the second LED;
generating a constant current from a constant current source to provide a bias current for the first and second LEDs, wherein the constant current source comprises a buck-type constant current source and the buck-type constant current source includes an inductor and a voltage source coupling switch;
receiving a control signal to control the voltage source coupling switch to couple an input voltage source to the inductor;
generating a third switch control signal to control a duty cycle of a third switch coupled in parallel across at least a third LED;
generating a fourth switch control signal to control a duty cycle of a fourth switch coupled to at least a fourth LED to vary a relative intensity of the third and fourth LEDs, wherein the third LED is coupled in series with the fourth LED;
generating and providing first control data to a first LED driver to control generation of the first and second switch control signals; and
receives second control data with a second LED driver via the first LED driver, wherein the first LED driver is coupled to the first and second switches and the second LED driver is coupled to the third and fourth switches.

15. The method of claim 14 further comprising:
generating and providing data to an LED driver to control generation of the first and second switch control signals.

16. The method of claim 14 wherein the second switch is coupled in parallel with the second LED.

17. The method of claim 14 further comprising:
generating N additional control signals to control duty cycles of N additional switches, wherein each of the N additional switches is coupled in parallel with at least one LED, each LED, including the first and second LEDs, are coupled in series, and N is an integer greater than or equal to one.

18. The method of claim 14 wherein the first switch control signal controls shunting of the first LED, the method further comprising:
generating a control signal to control an LED current flowing through the first and second LEDs;
varying an intensity of the first and second LEDs by varying a level of the LED current;
varying duty cycles of the respective first and second switches to control color mixing of the first and second LEDs.

19. The method of claim 18 further comprising:
generating a constant current to provide a bias current for the first and second LEDs.

20. The method of claim 14 further comprising:
detecting a malfunction of the first LED.

21. The method of claim 20 further comprising:
upon detection of the malfunction of the first LED, shunting the first LED with the first switch.

22. The method of claim 14 further comprising:
providing the second control data serially from the first LED driver to the second LED driver.

23. The method of claim 14 further comprising:
generating a third switch control signal to control a duty cycle of a third switch coupled to at least a third LED to vary a relative intensity of the first, second, and third, wherein the first, second, and third LEDs are coupled in series, the second switch is coupled in parallel with the second LED, the third switch is coupled in parallel with the third LED, the first LED is a red LED, the second LED is a green LED, the third LED is a blue LED; and
varying a duty cycle of the first, second, and third switches to vary colors generated by color mixing of the first, second, and third LEDs.

24. The method of claim 14 wherein to control the duty cycle of the first switch comprises generating a pulse width modulated first switch control signal and to control the duty cycle of the second switch comprises generating a pulse width modulated second switch control signal.

25. The method of claim 14 wherein to control the duty cycle of the first switch comprises generating a pulse width density modulated first switch control signal and to control the duty cycle of the second switch comprises generating a pulse width density modulated second switch control signal.

26. The method of claim 17 wherein N is selected from group consisting of: greater than or equal to 6, 12, and 13.

27. An apparatus for controlling multiple, series coupled light emitting diodes (LEDs), the apparatus comprising:
means for generating a first switch control signal to control a duty cycle of a first switch coupled in parallel across at least a first LED;
means for generating a second switch control signal to control a duty cycle of a second switch coupled to at least a second LED to vary a relative intensity of the first and second LEDs, wherein the first LED is coupled in series with the second LED;
means for generating a constant current from a constant current source to provide a bias current for the first and second LEDs, wherein the constant current source comprises a buck-type constant current source and the buck-type constant current source includes an inductor and a voltage source coupling switch;

means for receiving a control signal to control the voltage source coupling switch to couple an input voltage source to the inductor:

means for generating a third switch control signal to control a duty cycle of a third switch coupled in parallel across at least a third LED;

means for generating a fourth switch control signal to control a duty cycle of a fourth switch coupled to at least a fourth LED to vary a relative intensity of the third and fourth LEDs, wherein the third LED is coupled in series with the fourth LED;

means for generating and providing first control data to a first LED driver to control generation of the first and second switch control signals; and means for receives second control data with a second LED driver via the first LED driver, wherein the first LED driver is coupled to the first and second switches and the second LED driver is coupled to the third and fourth switches.

* * * * *

UNITED STATES PATENT AND TRADEMARK OFFICE
CERTIFICATE OF CORRECTION

PATENT NO. : 8,587,217 B2
APPLICATION NO. : 12/675035
DATED : November 19, 2013
INVENTOR(S) : John L. Melanson Page 1 of 1

It is certified that error appears in the above-identified patent and that said Letters Patent is hereby corrected as shown below:

In the Claims

Col. 9, line 28 should read "--a-- group consisting of: greater than or equal to 6, 12, and 13."

Col. 10, line 53 should read "--a-- group consisting of: greater than or equal to 6, 12, and 13."

Col. 11, line 17 should read "means for --receiving-- second control data with a second LED."

Signed and Sealed this
Twenty-first Day of April, 2015

Michelle K. Lee
*Director of the United States Patent and Trademark Office*